United States Patent Office 3,471,784
Patented Oct. 7, 1969

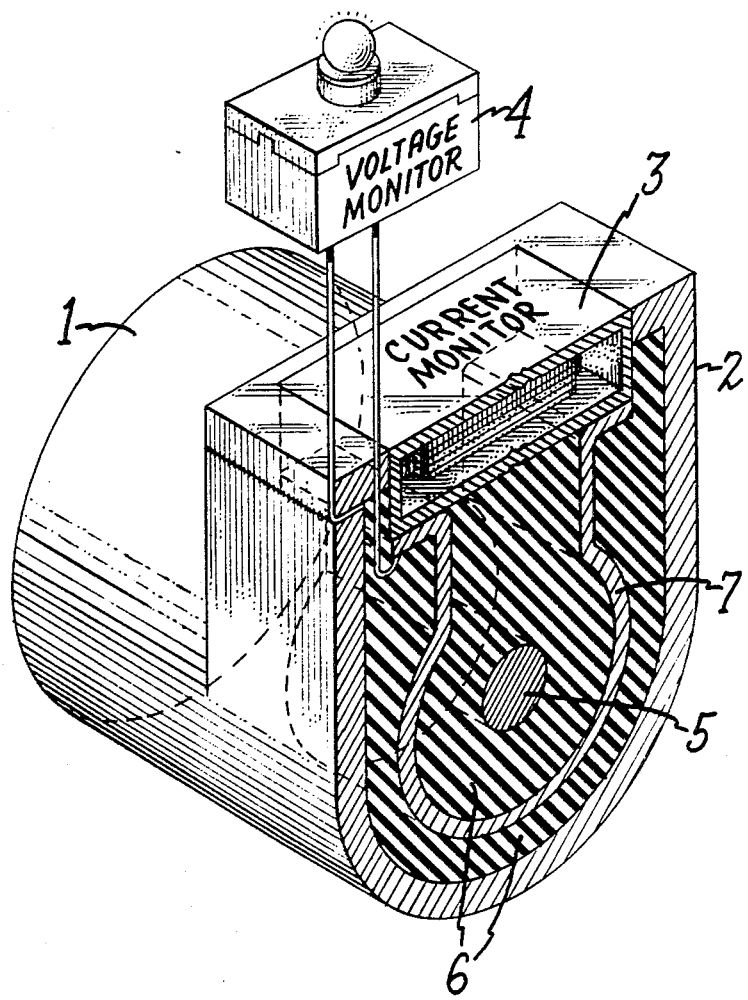

3,471,784
COMBINATION VOLTAGE AND MAGNETIC LOOP
Richard H. Arndt, Lenox, and Edward J. Kotski, Pittsfield, Mass., assignors to General Electric Company, a corporation of New York
Filed Sept. 14, 1967, Ser. No. 667,816
Int. Cl. G01r 19/16
U.S. Cl. 324—126                                    5 Claims

ABSTRACT OF THE DISCLOSURE

An insulated conductor's current monitor is powered by a magnetic pickup loop around the conductor within its insulation which loop also constitutes an electrostatic voltage pickup for powering a voltage monitor for the conductor.

---

This invention relates to monitoring of electrical conductors and more particularly to voltage and current monitoring of insulated high voltage to ground current carrying conductors.

While not limited thereto, the invention is particularly useful in shielded cable termination-connectors for underground electric power distribution systems. Conventionally such termination-connectors comprise a generally cylindrical cast non-magnetic conductive housing of generally circular cross section, there being an axially positioned electrical conductor in the housing insulated therefrom by insulation filling the housing. In use, the conductor is connected to the conductor of a coaxially shielded cable and the housing is connected to the cable shield, there being a stress cone or equivalent for grading the dielectric stress where the shield is stripped back to make such connections. Some such termination-connectors also include voltage and fault current monitors which greatly facilitate and expedite safe maintenance and repair of the system.

In accordance with this invention, a magnetic loop around the conductor within its insulation constitutes a magnetic pickup for powering a current monitor and said loop also constitutes part of a capacitive voltage divider voltage pickup for powering a voltage monitor.

An object of the invention is to provide a unitary combined voltage and magnetic pickup.

Another object of the invention is to provide a shielded cable termination-connector having a common unitary energy supply means for both a voltage monitor and a current monitor.

The invention will be better understood from the following description take in connection with the accompanying drawing and its scope will be pointed out in the appended claims.

Referring now to the single figure of the accompanying drawing, which is a transverse sectional view of a termination-connector embodying the invention, the termination-connector has a housing 1 which is generally circular in cross section and generally cylindrical in shape in that it is elongated in a direction perpendicular to the plane of the drawing. It also has an integral lateral extension 2 for housing some or all of the monitoring apparatus or circuitry 3 and 4 which extension is ordinarily shorter than the housing proper. The housing may be cast of suitable metal, preferably non-corrosive metal such as aluminum which is also nonmagnetic. Axially positioned in the housing is an elongated conductor 5. Insulation 6 which is preferably solid but may be liquid or gaseous serves to insulate conductor 5 from housing 1. Normally the central conductor of a high voltage coaxially shielded cable is connected to conductor 5 and the cable shield, at ground potential, is connected to the housing 1.

By high voltage is meant any voltage of an electric power source capable of electrocuting humans.

Within the insulation 6 is a magnetic pickup loop 7 around the conductor 5. It concentrates magnetic flux produced by current flow in conductor 5, and delivers the concentrated flux to the current monitor 3, the details of which form no part of the invention, A simple example is a spring biased magnetic armature such as is present in a conventional reed switch, which can either be actuated directly or indirectly by an operating coil energized by a pickup coil linking the magnetic pickup loop. Such features are per se old in the art.

The pickup loop 7 is also used to power or energize the voltage monitor 4 which may be any voltage responsive indicator such as a glow lamp. This is done by connecting the voltage monitor 4 between the normally grounded housing 1 and the pickup loop 7 which, by capacitive coupling, has a voltage to ground which is a fraction of the voltage of conductor 5 to ground. Thus parts 1, 5 and 7 constitute a capacitive voltage divider.

In order that pickup loop 7 have sufficient volume to collect an appreciable amount of flux and sufficient capacitance to deliver an appreciable current, its radial thickness and axial length are substantial. It, therefore, constitutes a split cylinder coaxially positioned with respect to the central conductor 5 and the cylindrical portion of the housing 1.

What we claim as new and desire to secure by Letters Patent of the United States is:

1. In a voltage and fault current monitoring termination-connector for coaxially shielded high voltage cable, an elongated metallic housing for connection to the cable shield and having a generally cylindrical portion, an elongated high voltage conductor for connection to the cable conductor mounted in said housing and extending along the axis of said cylindrical portion, insulation surrounding said elongated conductor and filling the space in said cylindrical portion, and a unitary step-down source of both cable voltage and cable current response for safe monitoring comprising a conductive magnetic split cylinder in said insulation and coaxially surrounding said conductor.

2. A cable termination-conductor as in claim 1 in which a cable voltage monitor is connected between said housing and said split cylinder.

3. A cable termination-conductor as in claim 1 in which a cable current monitoring element bridges the split in said cylinder.

4. A cable termination-connector as in claim 1 in which a cable voltage monitor is connected between said housing and said split cylinder and in which a cable current monitoring element magnetically bridges the split in said cylinder.

5. An insulated conductor having an outer non-magnetic conductive ground shield housing and being adapted to carry current at high voltage to ground, an external electrical monitoring device capacitively coupled to said conductor for indicating the existence of high voltage to ground on said conductor, an external electrical monitoring device elecromagnetically coupled to said conductor for indicating the passage of a predetermined current through said conductor, and common unitary means within the insulation of said conductor for providing both said capacitive coupling and said electromagnetic coupling, said common unitary means comprising a magnetic conductive sleeve surrounding said conductor within said housing and being insulated from both said conductor and said housing by said conductor insulation.

References Cited

UNITED STATES PATENTS

| | | | |
|---|---|---|---|
| 2,716,216 | 8/1955 | Schwenzfeier | 324—129 |
| 3,343,153 | 9/1967 | Waehner | 340—252 |
| 3,390,331 | 6/1968 | Brown et al. | 324—122 |

FOREIGN PATENTS 346,926  4/1931  Great Britain.

RUDOLPH V. ROLINEC, Primary Examiner
A. E. SMITH, Assistant Examiner

U.S. Cl. X.R.
324—127; 340—253